United States Patent
Gautam et al.

(10) Patent No.: US 10,305,796 B2
(45) Date of Patent: May 28, 2019

(54) ENHANCED FORWARDING DATABASE SYNCHRONIZATION FOR MEDIA ACCESS CONTROL ADDRESSES LEARNED IN INTERCONNECTED LAYER-2 ARCHITECTURES

(71) Applicant: Ciena Corporation, Hanover, MD (US)

(72) Inventors: Vineet Gautam, Dwarka (IN); Tajeshwar Gill, Gurgaon (IN); Mukesh Chhabra, New Delhi (IN)

(73) Assignee: Ciena Corporation, Hanover, MD (US)

(*) Notice: Subject to any disclaimer, the term of this patent is extended or adjusted under 35 U.S.C. 154(b) by 394 days.

(21) Appl. No.: 14/797,506

(22) Filed: Jul. 13, 2015

(65) Prior Publication Data

US 2016/0352622 A1 Dec. 1, 2016

(30) Foreign Application Priority Data

Jun. 1, 2015 (IN) .......................... 1564/DEL/2015

(51) Int. Cl.
*H04L 12/721* (2013.01)
*H04L 12/931* (2013.01)
*H04W 80/02* (2009.01)

(52) U.S. Cl.
CPC ............ *H04L 45/66* (2013.01); *H04L 49/201* (2013.01); *H04W 80/02* (2013.01)

(58) Field of Classification Search
CPC ....... H04L 45/245; H04L 45/66; H04W 80/02
See application file for complete search history.

(56) References Cited

U.S. PATENT DOCUMENTS

| | | |
|---|---|---|
| 6,556,541 B1 | 4/2003 | Bare |
| 7,305,458 B2 | 12/2007 | Hsue et al. |
| 7,626,930 B2 | 12/2009 | Agmon et al. |
| 7,760,619 B2 | 7/2010 | Abdulla et al. |
| 8,130,644 B2 | 3/2012 | Tanaka et al. |
| 2005/0030962 A1* | 2/2005 | Hou ........................ H04L 49/90 370/412 |
| 2006/0077914 A1* | 4/2006 | Rhee ................... G06F 13/4022 370/293 |
| 2007/0268915 A1 | 11/2007 | Zelig et al. |
| 2008/0089247 A1 | 4/2008 | Sane et al. |
| 2008/0107043 A1 | 5/2008 | Smith et al. |
| 2010/0150161 A1 | 6/2010 | Saksena et al. |
| 2011/0273987 A1 | 11/2011 | Schlansker et al. |

(Continued)

*Primary Examiner* — Walter J Divito
*Assistant Examiner* — Anthony Luo
(74) *Attorney, Agent, or Firm* — Clements Bernard Walker PLLC; Christopher L. Bernard; Lawrence A. Baratta, Jr.

(57) ABSTRACT

A method, in a switch in an interconnected layer-2 architecture, is disclosed for enhanced forwarding database synchronization of Media Access Control (MAC) addresses based on HIT logic. The method includes learning a MAC address against a port associated with the switch; storing the MAC address with information comprising a port Identifier (ID), a switch ID, and the enhanced HIT logic set to true; setting the enhanced HIT logic to false if the MAC address was not seen on the port at an end of a cycle; and synchronizing the MAC address with other switches in the interconnected layer-2 or multi-chassis architecture if the enhanced HIT logic is true at the end of the cycle.

18 Claims, 11 Drawing Sheets

(56) References Cited

U.S. PATENT DOCUMENTS

| | | | |
|---|---|---|---|
| 2011/0296098 A1* | 12/2011 | Sauber | G06F 1/3225 |
| | | | 711/106 |
| 2012/0033541 A1 | 2/2012 | Jacob Da Silva et al. | |
| 2012/0033665 A1 | 2/2012 | Jacob Da Silva et al. | |
| 2012/0033669 A1 | 2/2012 | Mohandas et al. | |
| 2012/0033678 A1 | 2/2012 | Page et al. | |
| 2012/0163164 A1 | 6/2012 | Terry et al. | |
| 2013/0346987 A1* | 12/2013 | Raney | G06F 9/5044 |
| | | | 718/102 |
| 2014/0044126 A1* | 2/2014 | Sabhanatarajan | H04L 45/02 |
| | | | 370/354 |
| 2014/0269738 A1* | 9/2014 | Pierson | H04L 49/101 |
| | | | 370/400 |
| 2014/0294010 A1* | 10/2014 | Biswas | H04L 45/245 |
| | | | 370/392 |
| 2015/0207667 A1* | 7/2015 | Basso | H04L 41/046 |
| | | | 709/223 |
| 2015/0295862 A1* | 10/2015 | Banerjee | H04L 49/602 |
| | | | 370/392 |

* cited by examiner

ENHANCED FORWARDING DATABASE SYNCHRONIZATION FOR MEDIA ACCESS CONTROL ADDRESSES LEARNED IN INTERCONNECTED LAYER-2 ARCHITECTURES

CROSS-REFERENCE TO RELATED APPLICATION(S)

The present patent application/patent claims the benefit of priority of Indian Patent Application No. 1564/DEL/2015, filed on Jun. 1, 2015, and entitled "ENHANCED FORWARDING DATABASE SYNCHRONIZATION FOR MEDIA ACCESS CONTROL ADDRESSES LEARNED IN INTERCONNECTED LAYER-2 ARCHITECTURES," the contents of which are incorporated in full by reference herein.

FIELD OF THE DISCLOSURE

The present disclosure generally relates to networking systems and methods. More particularly, the present disclosure relates to enhanced forwarding database synchronization for Media Access Control (MAC) addresses learned in interconnected layer-2 and multi-chassis architectures, such as with distributed aggregation ports or the like.

BACKGROUND OF THE DISCLOSURE

A single switch architecture is not scalable enough to support today's bandwidth hungry applications; therefore various multi-switch architectures have evolved, and the general theme among these architectures is a common interconnection mechanism between the various switches. That is, Ethernet switches are evolving from single devices to the large scale chassis with multiple line cards, blades, modules, "pizza boxes", etc. As described herein, line cards, blades, modules, "pizza boxes", etc. all refer to modules in an Ethernet switch and are collectively referred to herein as line cards. In one example, each line card in a chassis can be an individual switch although other embodiments can also be implemented. As described herein, the term line card can be used interchangeably for the term switch or interconnected switches. For example, individual line cards are each a switch, and the overall chassis or network element is a multi-switch architecture that is a single network element of the interconnected switches. From a network management/administrator's perspective, all these interconnected switches should give a singular switch view, e.g., it is not feasible to manage each line card as a separate network element. This architecture presents multiple challenges; one of them is a challenge of packet flooding as these switches' forwarding databases are not synchronized and thus media access control (MAC) address table lookup failures could cause flooding. Hence, if a MAC address is learned on say switch-A of an interconnect architecture and a stream with this resolved address starts from port that is on another switch (switch-B) then this stream's packets will get flooded.

MAC address learning is a service provided by a switch in which a MAC address and incoming interface information of each packet is learned locally and stored in a database on the switch. This service can be characterized as a learning bridge, in which a source MAC address of each received packet is stored in a forwarding database so that future packets destined for that address can be forwarded only to the bridge interface on which that address is located. Packets destined for unrecognized addresses are forwarded out every bridge interface. MAC address learning helps minimize traffic on the attached Local Area Networks (LANs). As Ethernet switch sizes evolve, maintenance of the forwarding database becomes significant. In the single device case, management of the forwarding database is straightforward in that all processing and storage circuitry related to the forwarding database is on the single device and in communication therein. As the large scale chassis develop, individual line cards have their own forwarding databases thereon that are managed, but need to be synchronized with other line cards in the same Ethernet switch. It is important to synchronize the forwarding databases between the line cards to avoid flooding when a MAC address has already been learned.

Conventionally, the multiple line card solution can include a central repository of the forwarding databases for all associated modules that is updated as and when required. However, this solution can cause the scalability issues especially in the case when the MAC address entries need to be synchronized on a periodic basis in case of topologies such as bridging over link aggregation. Multi-chassis architectures, therefore, employ a solution where line cards periodically update the MAC address in the peer line cards by a messaging mechanism. The messaging mechanism may either be implemented in software through some interprocess communications (IPC) mechanism or may be implemented in hardware (e.g., application specific integrated circuit (ASIC), network processor unit (NPU), field programmable gate array (FPGA), etc.). The hardware based periodic synchronization can utilize a lot of hardware bandwidth at timely intervals. As a result of which hardware switching capacity may exceed its total supported capacity and can result in periodic packet drops due to the synchronization. Among other things, this presents a challenge in meeting service layer agreements with end users.

Generally, conventional approaches to forward database synchronization include a control path forwarding approach and a data path forwarding approach. The control path forwarding approach uses the IPC mechanism for forwarding messages containing MACs to be synced, which is to be configured in a peer switch. The control path forwarding approach suffers from following drawbacks: inefficient and cumbersome software implementation, scalability becomes a challenge with increased IPC messaging, and processor load increases proportionally with large number of IPC call for large forwarding databases. The data path forwarding approach includes constructing a packet and sending it via the data path to its peer switches to trigger MAC learning. The data path forwarding approach suffers from following drawbacks: interference with data path bandwidth, and due to the interference, data path packet dropping can be encountered with large forwarding databases.

As switch architectures continue to grow, there is a need for an optimized approach for synchronizing forwarding database across multiple interconnected layer-2 switches such as a plurality of modules in a single chassis. An example of such an optimized approach is described in commonly-assigned U.S. patent application Ser. No. 14/275,920 filed May 13, 2014 and entitled "SYSTEMS AND METHODS FOR SYNCHRONIZING FORWARDING DATABASES ACROSS MULTIPLE INTERCONNECTED LAYER-2 SWITCHES," the contents of which are incorporated by reference herein. The systems and methods disclosed in U.S. patent application Ser. No. 14/275,920 work perfectly for faceplate or logical Link Aggregation Groups (LAG) (i.e., member ports on a same switch or device), but do not work for logical distributed LAG ports (i.e., member ports on different switches or devices). With distributed LAG, for example, there needs to be a mechanism to determine whether a MAC is native or non-native to a particular switch.

BRIEF SUMMARY OF THE DISCLOSURE

In an exemplary embodiment, a method, in a switch in an interconnected layer-2 or multi-chassis architecture, provides enhanced forwarding database synchronization of Media Access Control (MAC) addresses based on enhanced HIT logic. The method includes learning a MAC address against a port associated with the switch; storing the MAC address with information including a port Identifier (ID), a switch ID, and the enhanced HIT logic set to true; setting the enhanced HIT logic to false if the MAC address was not seen on the port at an end of a cycle; and synchronizing the MAC address with other switches in the interconnected layer-2 or multi-chassis architecture if the enhanced HIT logic is true at the end of the cycle. The enhanced HIT logic can have a property NATIVE_SA_HIT, which is set if the MAC address is seen on a local faceplate port and not backplane connected ports. The switch and the other switches can be configured in a Link Aggregation Group (LAG) and wherein the LAG is a Distributed LAG (DLAG) or Multi-Chassis LAG (MC-LAG). The synchronizing can include transmitting a data frame to the other switches via inter-switch connectivity, wherein the data frame is created to enable the other switches to learn the MAC address therefrom. The method can further include, upon learning the MAC address at the switch and transmitting the data frame, establishing a synchronization refresh timer less than an aging time for the MAC address, wherein the cycle ends when the synchronization refresh timer expires. The data frame can have a source address including the MAC address and a switch destination set such that the other switches receive the data frame. The data frame can include a sync unicast packet including an inter-switch header and a Layer-2 header. The inter-switch header can include a source switch indicator identifying the switch, a source port identifier identifying the port on the switch which learned the MAC address, a destination switch including a last switch of the other switches, and a destination port set to an invalid port on the last switch; and the Layer-2 header can include any value for a destination address, a source address set to the MAC address, and empty data. The switch and the other switches can be one of i) managed as a single switch from a network element perspective and a network management perspective; and ii) managed as part of more than one network element from a network management perspective.

In another exemplary embodiment, a switch includes one or more ports; switching circuitry communicatively coupled to the one or more ports; a forwarding database communicatively coupled to the switching circuitry; and inter-switch connectivity connecting the switch to one or more switches collectively forming a multi-switch architecture; wherein the switch is configured to learn a MAC address against a port of the one or more ports; store, in the forwarding database, the MAC address with information including a port Identifier (ID), a switch ID, and enhanced HIT logic set to true; set the enhanced HIT logic to false if the MAC address was not seen on the port at an end of a cycle; and synchronize the MAC address with the one or more switches if the enhanced HIT logic is true at the end of the cycle. The enhanced HIT logic has a property NATIVE_SA_HIT, which is set if the MAC address is seen on a local faceplate port and not backplane connected ports. The switch and the one or more switches can be configured in a Link Aggregation Group (LAG) and wherein the LAG is a Distributed LAG (DLAG) or Multi-Chassis LAG (MC-LAG). The MAC address can be synchronized by transmitting a data frame to the one or more switches via the inter-switch connectivity, wherein the data frame is created to enable the one or more switches to learn the MAC address therefrom. The switch can be further configured to, upon learning the MAC address at the switch and transmitting the data frame, establish a synchronization refresh timer less than an aging time for the MAC address, wherein the cycle ends when the synchronization refresh timer expires. The data frame can have a source address including the MAC address and a switch destination set such that the one or more switches receive the data frame. The data frame can include a sync unicast packet including an inter-switch header and a Layer-2 header. The inter-switch header can include a source switch indicator identifying the switch, a source port identifier identifying the port on the switch which learned the MAC address, a destination switch including a last switch of one or more switches, and a destination port set to an invalid port on the last switch; and the Layer-2 header can include any value for a destination address, a source address set to the MAC address, and empty data. The switch and the other switches can be managed as a single switch from a network element perspective and a network management perspective.

In a further exemplary embodiment, a multi-switch architecture includes a plurality of interconnected switches each including one or more ports and a forwarding database; inter-switch connectivity configured to connect the plurality of interconnected switches; data path queues associated with the inter-switch connectivity; and a dedicated queue associated with the inter-switch connectivity and separate from the data path queues, wherein the dedicated queue is configured for the exchange of data frames between the plurality of interconnected switches for synchronization of the forwarding database of each of the plurality of interconnect switches, wherein, upon learning a new Media Access Control (MAC) address on a port of the one or more ports of a switch of the plurality of interconnected switches, the switch transmits a data frame on through the dedicated queue for the remaining interconnected switches to learn the new MAC address, and wherein each of the plurality of interconnected switches maintains enhanced HIT logic for each learned MAC address with the enhanced HIT logic set to false if the learned MAC address is not seen in a cycle, and the enhanced HIT logic is used to determine whether to refresh synchronization of the learned MAC address. At least two of the plurality of interconnected switches can be configured in a Distributed Link Aggregation Group (DLAG) or a Multi-Chassis Link Aggregation Group (MC-LAG).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
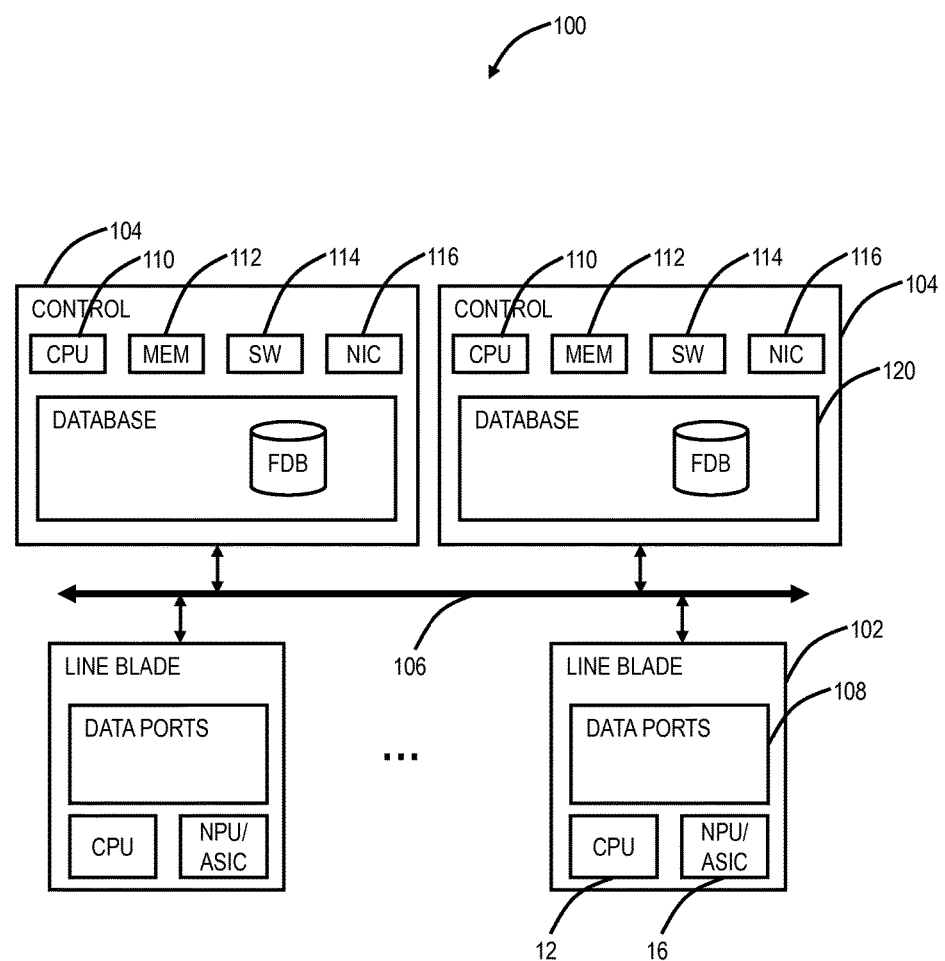
FIG. 1 is a block diagram of an exemplary implementation of a node for the systems and methods described herein.

In various exemplary embodiments, enhanced forwarding database synchronization systems and methods are described for learning Media Access Control (MAC) addresses on distributed LAG ports in an interconnected Layer 2 architecture. The systems and methods described herein offers an effective methodology for synchronizing learned forwarding database (MACs) to the remote switches within interconnect switch architecture for the aggregated ports that have ports on multiple switches, i.e., Distributed LAG (DLAG) ports or Multi-Chassis LAG (MC-LAG). Specifically, the system and methods include managing an enhanced HIT property of a MAC address to denote whether traffic is ingressing with specific source MAC address. A HIT property denotes whether or not a MAC address was hit in a last aging cycle. A HIT of destination MAC address is called DA_HIT, and a HIT of source MAC address is called SA_HIT. The systems and methods include enhancements to MAC address management to mark each as native or non-native, including for logical distributed aggregated ports or logical multi-chassis aggregated ports, as well as other port types. These enhancements use the HIT properties already used for aging and synchronization of MAC addresses. The systems and methods are scalable in terms of increasing a number of ports in distributed aggregated ports, for MAC synchronization. Also, the systems and methods are scalable in terms of a large number of forwarding database entries.

The systems and methods include synchronizing forwarding databases across multiple interconnected layer-2 switches such as a plurality of modules in a single chassis are described. The systems and methods can be viewed as an enhanced data path forwarding approach where a sync packet is constructed by a switch and sent over backplane ports to peer switches. The peer switches are the other switches in a multi-switch architecture associated with the sending switch. In the systems and methods, a separate queue that is not used for data is used forwarding the sync packets to the peer switches over the backplane ports or any other port used for inter-device communication to peer switches. Apart from saving on all of the drawbacks of the control path forwarding approach, using a separate queue to forward sync packet reduces the data path interference as well. In a multi-switch architecture, switches communicate via inter-switch connectivity (ports/queues) which is of higher bandwidth as the ports/queues are used to transmit both control and data packets across the multiple switches. Each switch in this architecture has pre-configured transition configuration for reaching other switches in an interconnected switch domain, i.e. the multi-switch architecture. The systems and methods utilize this inter-switch connectivity (ports/queues) for synchronization of the forwarding database. For syncing MACs across multiple switches, a sync packet is sent over this inter-switch connectivity to trigger remote learning in the remote line card's forwarding database. A sync packet is a packet with a MAC source address (SA) set to the MAC, which is needed to be synchronized. The sync packet destination port is set to an invalid port, so it gets dropped and should not be consumed as control or sent out at egress side. The enhanced data path forwarding approach has various advantages including it does not impact the data path, as data path queues are separate queues, and for sending sync packets any low priority queues between interconnected switches will be selected, and the usage of inter-switch connectivity (ports/queues) ensures that syncing performance has better time complexity and lesser software complexity than an out of band implementation for sending control packet for synchronizing forwarding database.

Referring to FIG. 1, in an exemplary embodiment, a block diagram illustrates an exemplary implementation of the node 100. In this exemplary embodiment, the node 100 is an Ethernet network switch, but those of ordinary skill in the art will recognize the systems and methods described herein contemplate other types of network elements and other implementations. In this exemplary embodiment, the node 100 includes a plurality of blades 102, 104 interconnected via an interface 106. The blades 102, 104 are also known as line cards, line modules, circuit packs, pluggable modules, etc. and refer generally to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a CPU) and a network processor (NP)/application specific integrated circuit (ASIC). As described herein, the line blades 102 can participate in systems and methods for synchronizing forwarding database across multiple interconnected layer-2 switches. Also, as described herein, the line blades 102 can participate in MAC address learning using the NP/ASIC and synchronizing learnt MAC addresses.

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this exemplary embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 2:
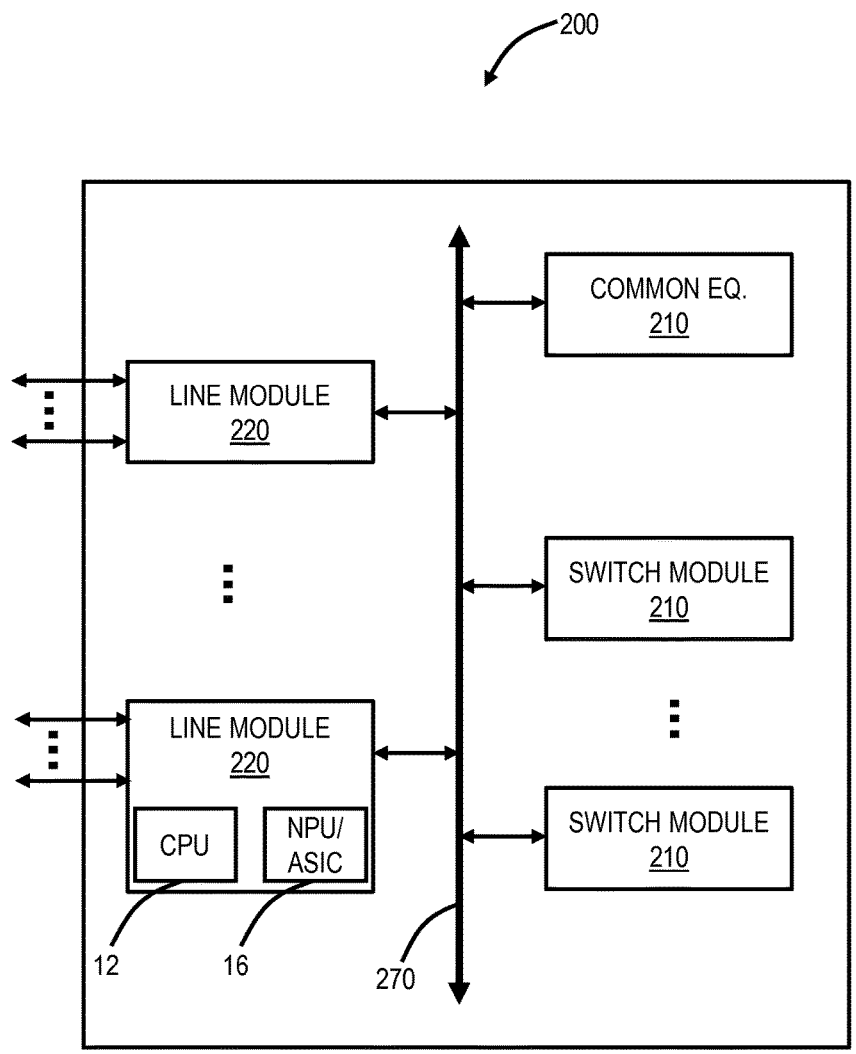
FIG. 2 is a block diagram of another exemplary implementation of a node for the systems and methods described herein.

Referring to FIG. 2, in an exemplary embodiment, a block diagram illustrates another exemplary implementation of a node 200. For example, the node 100 can be a dedicated Ethernet switch whereas the node 200 can be a multiservice platform. In an exemplary embodiment, the node 200 can be a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 200 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of channels, timeslots, tributary units, wavelengths, etc. While the node 200 is shown as an optical network element, the systems and methods are contemplated for use with any switching fabric, network element, or network based thereon.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 together. For example, the interface 3270 can be a backplane, mid-plane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three stage Clos switch. The line modules 220 can include optical or electrical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 230 can include both Time Division Multiplexed (TDM) (i.e., circuit switching) and packet switching engines. The switch modules 230 can include redundancy as well, such as 1:1, 1:N, etc.

Those of ordinary skill in the art will recognize the nodes 100, 200 can include other components that are omitted for illustration purposes, and that the systems and methods described herein are contemplated for use with a plurality of different nodes with the nodes 100, 200 presented as an exemplary type of node. For example, in another exemplary embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein. In general, the systems and methods described herein contemplate use with any node providing switching or forwarding of channels, timeslots, tributary units, wavelengths, etc.

Figure 3:
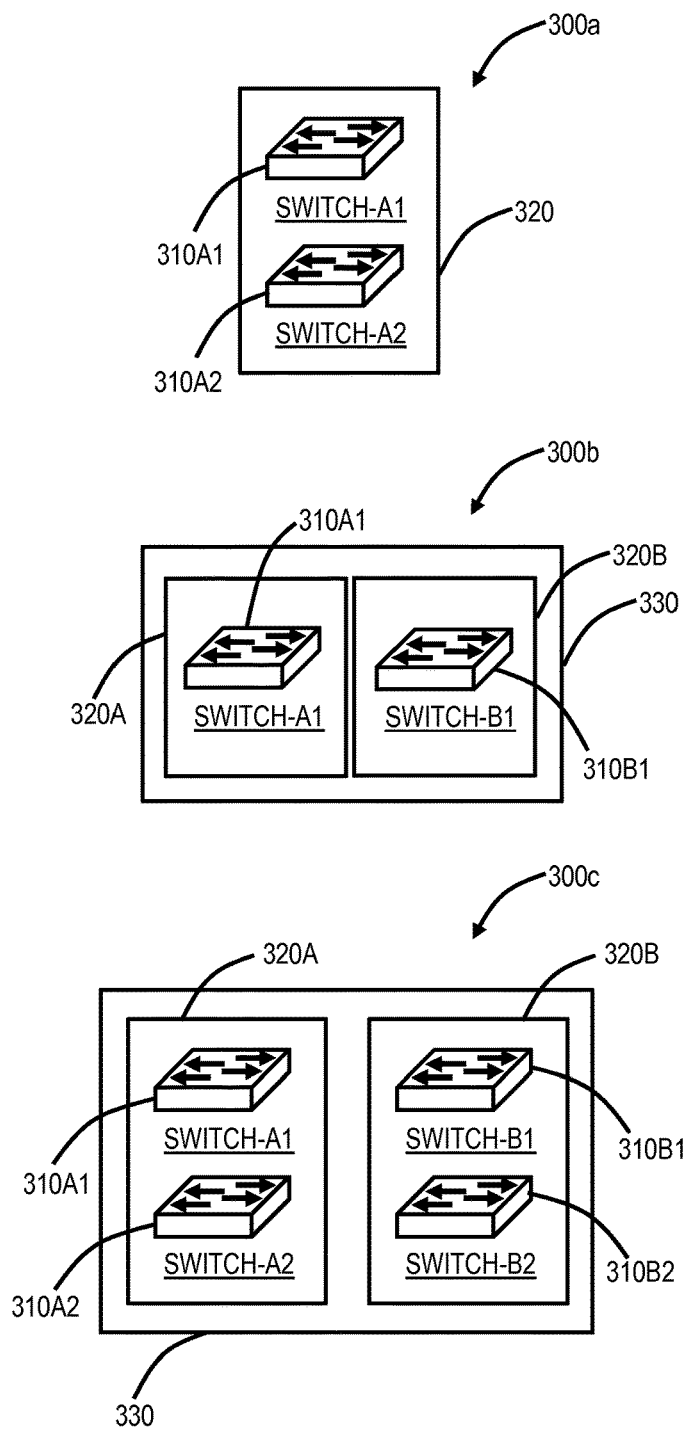
FIG. 3 is a block diagram of various multi-switch architectures for the systems and methods described herein.

Referring to FIG. 3, in an exemplary embodiment, a block diagram illustrates various multi-switch architectures 300a, 300b, 300c for the systems and methods described herein. In the multi-switch architecture 300a, two switches 310A1, 310A2 are located on a same line card 320. In the multi-switch architecture 300b, a switch 310A1 is located on a first line card 320A and a switch 310B1 is located on a second line card 320B. The line cards 320A, 320B are interconnected between one another via a backplane on a chassis 330. In the multi-switch architecture 300c, a first line card 320A includes switches 310A1, 310A2 and a second line card 320B includes switches 310B1, 310B2. The line cards 320A, 320B are interconnected between one another via a backplane on a chassis 330. For inter-switch connectivity between the various switches 310A1, 310A2, 310B1, 310B2, the chassis 330 can include the backplane as well as communications on the line cards 320, 320A, 320B. These multi-switch architectures 300a, 300b, 300c provide a singular view to an administrator, i.e., it hides the facts that there are multiple switches 310A1, 310A2, 310B1, 310B2 involved; the administrator just sees an increased number of ports for establishing services. The multi-switch architectures 300a, 300b, 300c are presented for illustration purposes, and those of ordinary skill in the art will recognize various other multi-switch architectures are contemplated.

Figure 4:
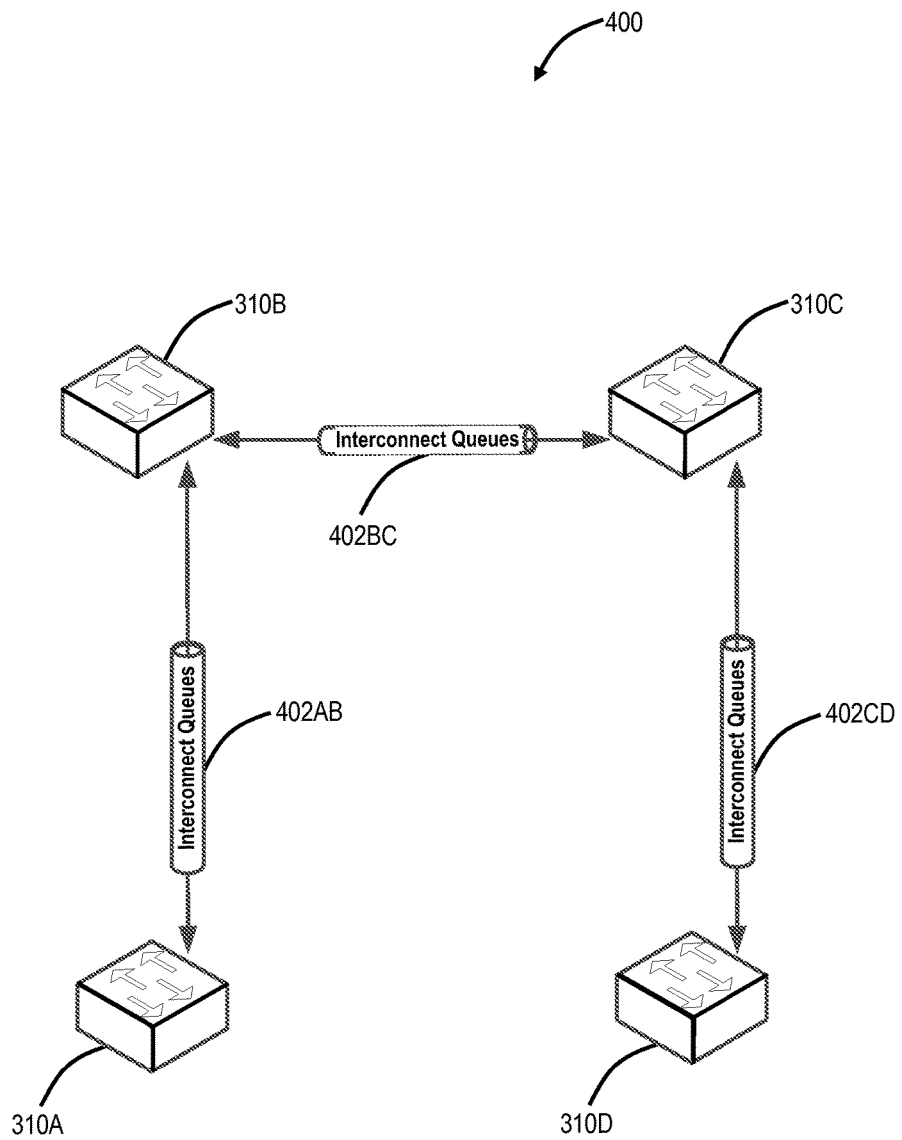
FIG. 4 is a block diagram of a multi-switch architecture and associated inter-switch connectivity via interconnect queues.

Referring to FIG. 4, in an exemplary embodiment, a block diagram illustrates a multi-switch architecture 400 and associated inter-switch connectivity via interconnect queues 402. The switch architecture 400 includes switches 310A, 310B, 310C, 310D. The switch 310A is communicatively coupled to the switch 310B via an interconnect queue 402AB, the switch 310B is communicatively coupled to the switch 310C via an interconnect queue 402BC, and the switch 310C is communicatively coupled to the switch 310D via an interconnect queue 402CD. For example, the switches 310A, 310B can be on a line card with the interconnect queue 402AB located on the line card and/or on a backplane, the switches 310C, 310D can be on another line card with the interconnect queue 402CD located on the line card and/or on the backplane, and the interconnect queue 402BC can be on the backplane. Other embodiments are also contemplated.

Figure 5:
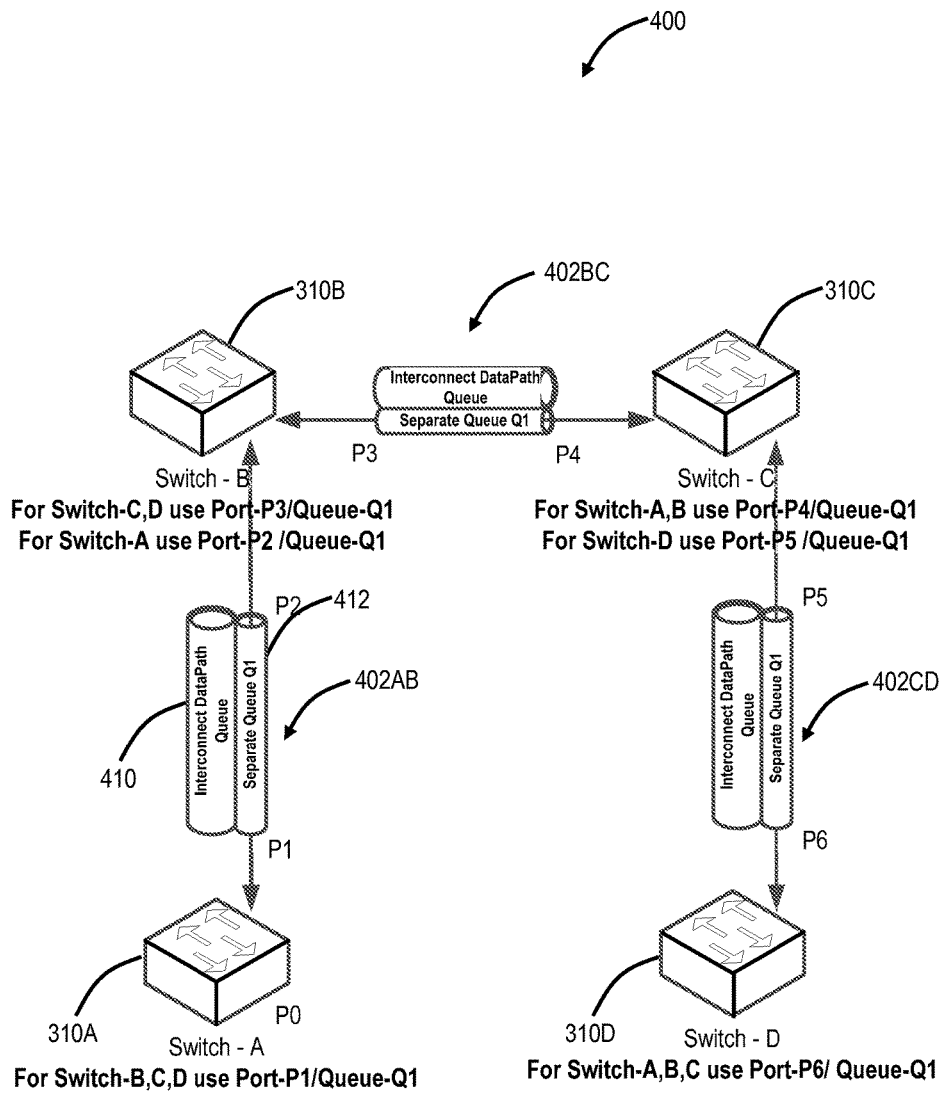
FIG. 5 is a block diagram of a multi-switch architecture and associated inter-switch connectivity via interconnect queues showing an enhanced data path forwarding approach.

Referring to FIG. 5, in an exemplary embodiment, a block diagram illustrates the multi-switch architecture 400 and the associated inter-switch connectivity via interconnect queues 402 showing the enhanced data path forwarding approach. The enhanced data path forwarding approach includes different queues for the data path interconnects and forwarded sync frames for MAC learning. Specifically, each of the interconnect queues 402AB, 402BC, 402CD include an interconnect data path queue 410 and a separate queue (Q1) 412. The switches 310A, 310B, 310C, 310D are configured to transmit sync frames to one another via the separate queue 412 upon learning a new MAC address and include port numbers (P1, P2, P3, P4, P5, P6). For example, the switch 310A can use a port P1 and the separate queue 412 to transmit a sync frame to the switches 310B, 310C, 310D upon learning a new MAC address. The switch 310B can use a port P2 and the separate queue 412 to transmit a sync frame to the switch 310A and a port P3 and the separate queue 412 to transmit a sync frame to the switches 310C, 310D. The switch 310C can use a port P4 and the separate queue 412 to transmit a sync frame to the switched 310A, 310B and a port P5 and the separate queue 412 to transmit a sync frame to the switch 310D. The switch 310D can use a port P6 and the separate queue 412 to transmit a sync frame to the switches 310A, 310B, 310C. In this manner, the sync frames can be transmitted in either direction or both such that any new MAC address learned by any of the switches 310A, 310B, 310C, 310D is subsequently learned by all of the switches.

In an exemplary embodiment, the sync frame can be a unicast packet that includes an inter-switch header and a layer-2 header that can include the following attributes with examples in FIG. 5:

Inter-Switch Header

| | |
|---|---|
| Source switch | Switch learning the new MAC address - e.g., switch 310A, 310B, 310C, 310D |
| Source port | Port number, e.g., P0, P1, P2, P3, P4, P5, P6 |
| Destination switch | End point of the sync frame, will be either switch 310A or switch 310D in FIG. 5 such that all switches see the sync frame |
| Destination port | INVALID |

Layer-2 Header

| | |
|---|---|
| Destination address (DA) | <don't care> |
| Source address (SA) | Newly learned MAC address, e.g. 00:01:02:03:04:05 |
| Length/Type/VID | X |
| Data | empty |

By using the queues 412 and ports in FIG. 5, the four switches 310A, 310B, 310C, 310D are connected and can learn the MAC addresses on any of the interconnected switches 310A, 310B, 310C, 310D. Thus, the associated forwarding databases can be synchronized. Note, only MAC addresses learned on a native switch port are forwarded for synchronization, and MAC addresses learned due to synchronization on different switches (remotely learned) are not forwarded for syncing. The trigger for initiating the sync packet is only from the native switch (On which MAC is originally learned). Specifically, this approach only synchronizes MAC addresses that are learned on a local layer-2 switch faceplate ports only and according to new enhanced HIT logic for these MAC addresses, a NATIVE_SA_HIT bit is set denoting the native-ness of the MAC addresses. Conversely, MAC addresses that are remotely learned are referred to as non-native MAC addresses that are not synchronized, and the NATIVE_SA_HIT bit is not set.

The syncing logic is described as follows with reference to FIG. 5. For a MAC address learned on the switch 310A, a sync packet shall be sent via the port P1 and the queue Q1 412 destined to an invalid port of the switch 310D for triggering MAC learning on remote switches (switches 310B, 310C, 310D). The destination port for sync packet should be an invalid port on the destined switch (switch 310D) so that sync packet will get dropped at egress end, without affecting control or data path in the multi-switch architecture 400. The port Px identifies the port to be used for forwarding sync packet so that the packet is sent to remote switch via inter-switch connectivity. Qx identifies the queue to be used for forwarding the sync packet so that the packet is sent to remote switches via inter-switch connectivity. This queue should be different from data path queues. Using a separate queue will avoid any data path interference due to this sync packet.

Note, the interconnect queues 402AB, 402BC, 402CD must be arranged such that all the switches 310A, 310B, 310C, 310D are reachable from all other switches. For the destination switch, the sync packet is addressed to a last switch in a path of the interconnect queues 402AB, 402BC, 402CD. The interconnect queues 402AB, 402BC, 402CD can be a mesh interconnection of a linear interconnection as shown in FIG. 5. As long as the switches 310A, 310B, 310C, 310D are aware of the architecture, i.e. which interconnect queues 402AB, 402BC, 402CD connect to which switches and the final switch at the end of each path, the interconnect queues 402AB, 402BC, 402CD can be any topology.

Similarly, MACs learned on the other switches 310B, 310C, 310D in the multi-switch architecture 400 are forwarded and hence learned on remote switches forwarding databases. These details are captured as follows. For a MAC address learned on the switch 310B, a sync packet shall be sent via P3/Q1 destined to an invalid port of the switch 310D for triggering MAC learning on remote switches (switches 310C, 310D) and another sync packet shall be sent via P2/Q1 destined to invalid port of the switch 310A for triggering MAC learning on the switch 310A. For a MAC address learned on the switch 310C, a sync packet shall be sent via P4/Q1 destined to invalid port of the switch 310A for triggering MAC learning on remote switches (switches 310A, 310B) and another sync packet shall be sent via P5/Q1 destined to invalid port of the switch 310D for triggering MAC learning on the switch 310D. Finally, for a MAC address learned on the switch 310D, a sync packet shall be sent via P6/Q1 destined to invalid port of the switch 310A for triggering MAC learning on remote switches (switches 310A, 310B 310C).

Figure 6:
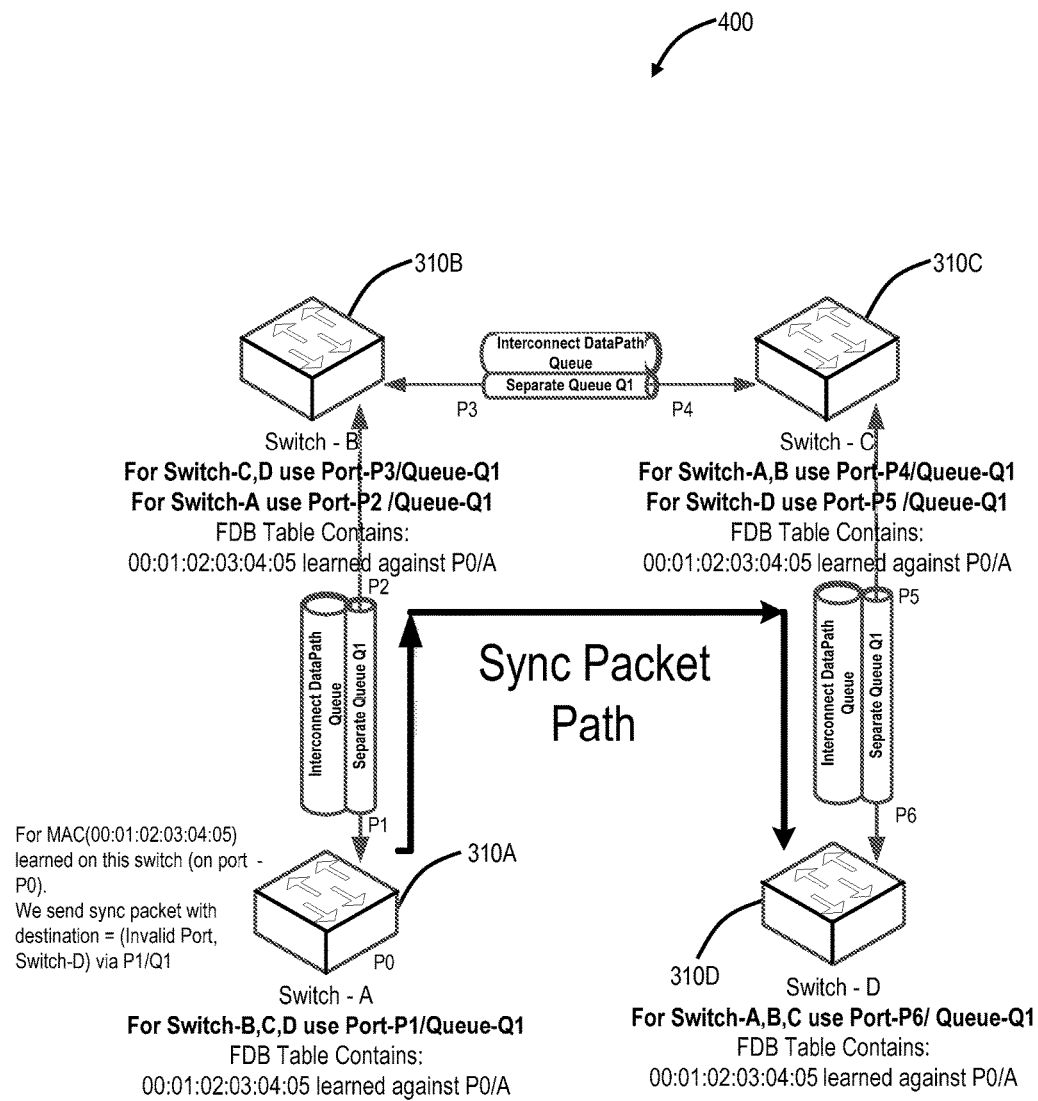
FIG. 6 is a block diagram of a multi-switch architecture showing an exemplary operation the enhanced data path forwarding approach.

Referring to FIG. 6, in an exemplary embodiment, a block diagram illustrates the multi-switch architecture 400 showing an exemplary operation the enhanced data path forwarding approach. Here, the switch 310A learns a MAC address {00:01:02:03:04:05} learned on this switch (on a port, e.g. P0). A forwarding database for the switch 310A now includes the MAC {00:01:02:03:04:05} learned against P0 on the switch 310A. A sync packet is sent with the destination={invalid port, switch 310D} via P1/Q1. The sync packet is received at the switch 310B and its forwarding database now includes the MAC {00:01:02:03:04:05} learned against P0 on the switch 310A, and the switch 310B forwards the sync packet to the switch 310C via P3/Q1 since the sync packet destination={invalid port, switch 310D}. The sync packet is received at the switch 310C and its forwarding database now includes the MAC {00:01:02:03:04:05} learned against P0 on the switch 310A, and the switch 310C forwards the sync packet via P4/Q1 to the switch 310D since the sync packet destination={invalid port, switch 310D}. Finally, the switch 310D receives the sync packet and its forwarding database now includes the MAC {00:01:02:03:04:05} learned against P0 on the switch 310A, and the switch 310D discards the sync packet due to the invalid port.

In this example, MAC {00:01:02:03:04:05} ingresses on the switch 310A so it gets learned against P0 on the switch 310A, and since it is a native MAC, it gets synced to all the other switches 310B, 310C, 310D). It is a native MAC because it is received on local port P0 on the switch 310A, i.e., the port/switch ID combination for the MAC address show that the port is on the same switch (i.e., P0 on the switch 310A). The switches 310B, 310C, 310D never initiates syncing of this MAC address as their switch ID and the MAC switch ID are different and, therefore, the MAC address is non-native. As described herein, this solution is valid for faceplate or logical LAG port (with member ports on same switch), but will not work for logical distributed LAG ports (with member ports on different switches).

Figure 7:
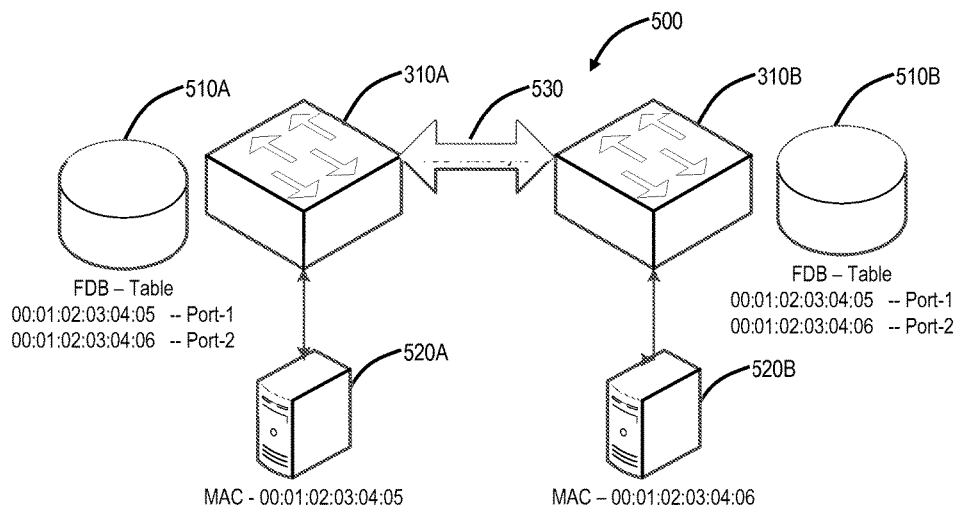
FIG. 7 is a block diagram of a multi-switch architecture with two switches showing an exemplary operation the enhanced data path forwarding approach.

Referring to FIG. 7, in an exemplary embodiment, a block diagram illustrates a multi-switch architecture 500 with two switches 310A, 310B showing an exemplary operation the enhanced data path forwarding approach. Forwarding database synchronization of dynamically learned MAC addresses between the interconnected switches 310A, 310B is aimed at distributing dynamic MAC entries received on a particular switch to other switches in the given equipment group. The synchronization of dynamic MACs reduces flooding of unknown unicast packets by spreading MAC learning across switches under the same equipment group. This improves packet processing rate, as the packet is transmitted to destined interface instead getting flooded in the entire virtual LAN. Each of the switches 310A, 310B maintains a forwarding database 510A, 510B containing learned MAC entries. On receiving a packet MAC, the SA is checked in the forwarding database 510A, 510B. If the forwarding database 510A, 510B does not contain MAC entries, it is added to the forwarding database 510A, 510B for future forwarding decisions and the packet is flooded to all the ports of a virtual LAN. Again, in a Layer-2 system that combines multiple switches 310A, 310B to enhance switching and bandwidth capability, there are multiple forwarding databases 510A, 510B. To better utilize the multiple switch capability, entries in the forwarding databases 510A, 510B are synchronized to other forwarding databases 510A, 510B, thereby spreading the learning and reduces the flooding of unknown unicast packets.

For example, in FIG. 7, the multi-switch architecture 500 can include the switch 310A being connected to a client 520A (MAC {00:01:02:03:04:05}) and the switch 310B being connected to a client 520B (MAC {00:01:02:03:04:06}). The switch 310A learns the MAC address of the client 520A on a port receiving packets from the client 520A, stores the MAC {00:01:02:03:04:05} in its forwarding database 510A, and synchronizes the client 520A's MAC address with the switch 310B by sending a sync packet to the switch 310B over a link 530 such as on a backplane. The sync packet includes an Inter-switch header of {source switch=switch 310A, source port=P1, destination switch=switch 310B, destination port=INVALID} and a Layer-2 header of {DA=<don't care>, SA=00:01:02:03:04:05}. Upon receipt, the switch 310B learns the MAC {00:01:02:03:04:05} and stores its forwarding database 510B, and discards the sync packet.

The switch 310B learns the MAC address of the client 520B on a port receiving packets from the client 520B, stores the MAC {00:01:02:03:04:06} in its forwarding database 510B, and synchronizes the client 520B's MAC address with the switch 310A by sending a sync packet to the switch 310A over a link 530 such as on a backplane. The sync packet includes an Inter-switch header of {source switch=switch 310B, source port=P2, destination switch=switch 310A, destination port=INVALID} and a Layer-2 header of {DA=<don't care>, SA=00:01:02:03:04:06}. Upon receipt, the switch 310A learns the MAC {00:01:02:03:04:06} and stores its forwarding database 510A, and discards the sync packet.

Figure 8:
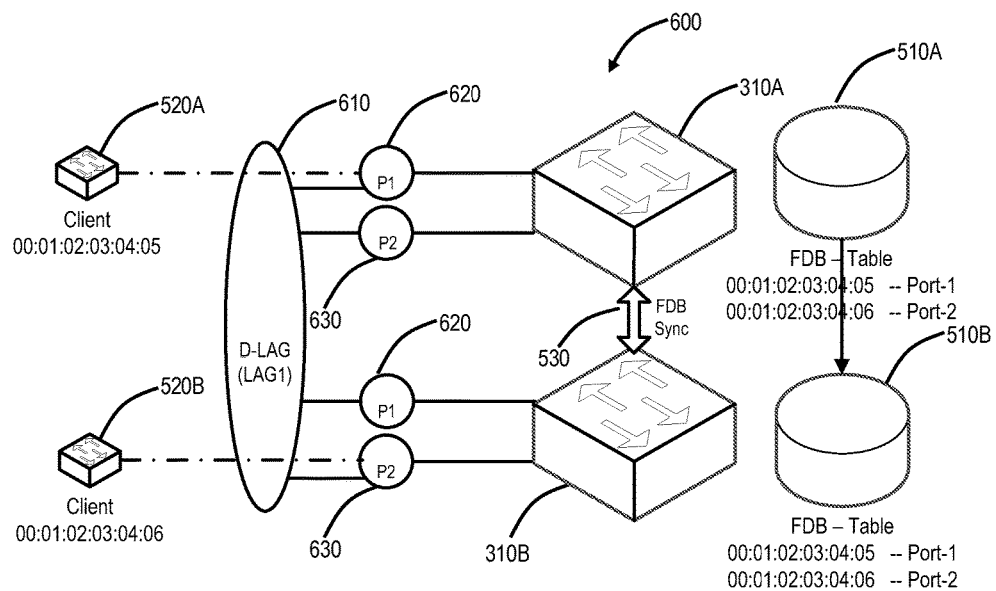
FIG. 8 is a block diagram of a multi-switch architecture with two switches showing an exemplary operation the enhanced data path forwarding approach in a link aggregation group (LAG)

Referring to FIG. 8, in an exemplary embodiment, a block diagram illustrates a multi-switch architecture 600 with two switches 310A, 310B showing an exemplary operation the enhanced data path forwarding approach in a distributed link aggregation group (LAG) 610. The multi-switch architecture 600 includes the same switches 310A, 310B with corresponding forwarding databases 510A, 510B as in FIG. 7. Here, the switches 310A, 310B are configured in the LAG 610. The LAG 610 includes combining (aggregating) multiple connections to increase overall throughput. The LAG 610 includes two ports 620, 630. Synchronization of the forwarding databases 510A, 510B becomes more important in the LAG 610 configuration that has the ports 620, 630 spread across the different switches 310A, 310B. As the LAG 610 gives users a view of a single logical port, hence spreading the forwarding databases 510A, 510B learning to all the switches 310A, 310B which host the LAG 610 ports 620, 630 enhances the LAG 610 behavior and performance.

In FIG. 8, the client 520A is connected to the port 620 on the switch 310A (note, the port 620 is also on the switch 310B as part of the LAG 610). The switch 310A learns the MAC of the client 520A, stores it in the forwarding database 510A, and synchronizes, via a sync packet, to the switch 310B via the link 530. The switch 310B learns the MAC of the client 520A from the sync packet and stores it in the forwarding database 510B. Similarly, the client 520B is connected to the port 630 on the switch 310B (note, the port 630 is also on the switch 310A as part of the LAG 610). The switch 310B learns the MAC of the client 520B, stores it in the forwarding database 510B and synchronizes, via a sync packet, to the switch 310A via the link 530. The switch 310A learns the MAC of the client 520B from the sync packet and stores it in the forwarding database 510A.

Figure 9:
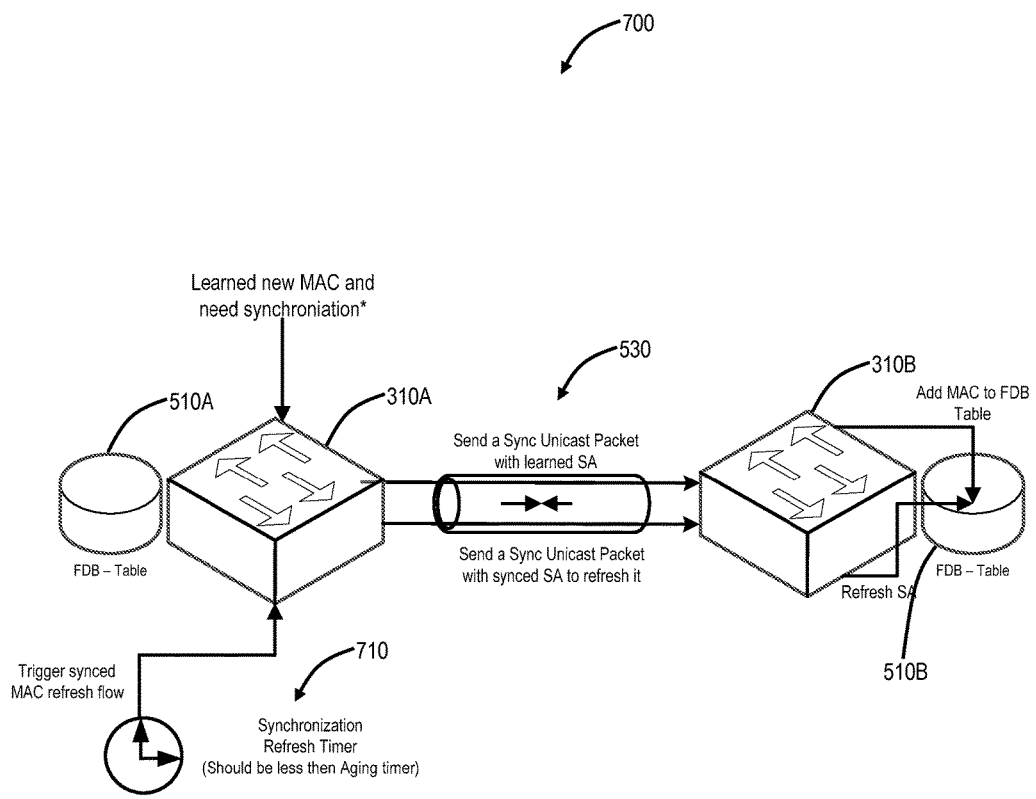
FIG. 9 is a block diagram of a multi-switch architecture with two switches showing an exemplary operation the enhanced data path forwarding approach with synchronization refresh.

Referring to FIG. 9, in an exemplary embodiment, a block diagram illustrates a multi-switch architecture 700 with two switches 310A, 310B showing an exemplary operation the enhanced data path forwarding approach with synchronization refresh. Here, the switch 310A learns a new MAC address, stores it in the forwarding database 510A, sends a sync unicast packet with the learned MAC address to the switch 310B via the link 530, and starts a synchronization refresh timer 710. The synchronization refresh timer 710 should be less than an aging time for the learned MAC address, and upon expiration, the synchronization refresh timer 710 causes the switch 310A to trigger a synced MAC refresh flow on the link 530. The switch 310B receives the initial sync unicast packet and adds the MAC address to a table in the forwarding database 510B. Also, the switch 310B discards the sync packet as it is at the end of the link 530. The switch 310A send periodic sync unicast packets to the switch 310B at the expiration of the synchronization refresh timer 710 that causes the switch 310B to refresh the forwarding database 510B.

Figure 10:
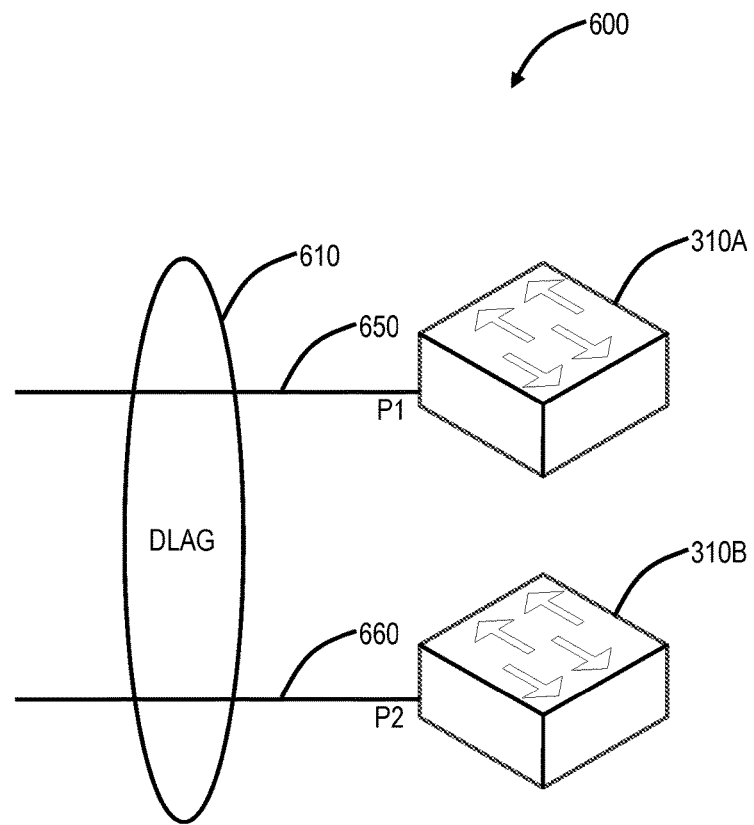
FIG. 10 is a block diagram of a portion of the multi-switch architecture with two switches showing an exemplary synchronization operation in the distributed link aggregation group (DLAG)

Referring to FIG. 10, in an exemplary embodiment, a block diagram illustrates a portion of the multi-switch architecture 600 with two switches 310A, 310B showing an exemplary synchronization operation in the distributed link aggregation group (LAG) 610. For the DLAG 610 port, there are multiple ports 650, 660 from different layer-2 switches 310A, 310B aggregated together and MAC addresses are not learned on actual physical port, but rather on a logically aggregated port, hence deciding whether learned a MAC address is native or non-native is a challenge. In FIG. 10, the DLAG 610 port (say dlagPort) has two ports (P1 port 650 on the switch 310A and P2 port 660 on the switch 310B). Now deciding whether a MAC address is learned on the dlagPort is native to the switches 310A, 310B is not possible because with the aforementioned approaches; rather, each switch 310A, 310B will mark MAC addresses learned against the DLAG 610 port as native. Hence, FDB synchronization will not work as expected for DLAG 610 ports. Specifically, the aforementioned FDB synchronization logic will see both the switches 310A, 310B refreshing with periodic sync unicast packets. Thus MAC addresses will never age out. This is because the aforementioned FDB synchronization logic only refreshes native MAC addresses, but the DLAG ports 610 can see any learned MAC addresses as being native to both the switches 310A, 310B.

In this regard, the present disclosure provides an enhanced approach to decide the native-ness of the MAC addresses learned on DLAG ports for correct FDB synchronization behavior. The present disclosure proposes managing an enhanced HIT property of a MAC address to decide whether a MAC address learned is native or non-native to a given layer-2 switch. A HIT of a MAC address denotes whether or not a MAC address entry was hit in the last aging cycle or not. The HIT of a destination MAC address is called DA_HIT, and the HIT of source MAC address is called SA_HIT. The HIT can be managed by firmware, hardware, or software, and there can be HIT logic for each MAC address. That is, the HIT property is something that tracks whether or not a MAC address has been hit in a cycle for aging in the FDB.

In the present disclosure, another variant is added to the HIT property, namely NATIVE_SA_HIT (which denotes whether local faceplate traffic is ingressing the specific source MAC address). This enhanced HIT property of a MAC address shall be used for deciding whether the MAC address should be termed as native or non-native and whether it should be synchronized or not. This enhances the synchronization logic described herein with updated HIT logic for the MAC addresses to identify the native-ness of a MAC address and thereby deciding whether the MAC address needs to be synced in an interconnected layer-2 or multi-chassis configuration or not.

Figure 11:
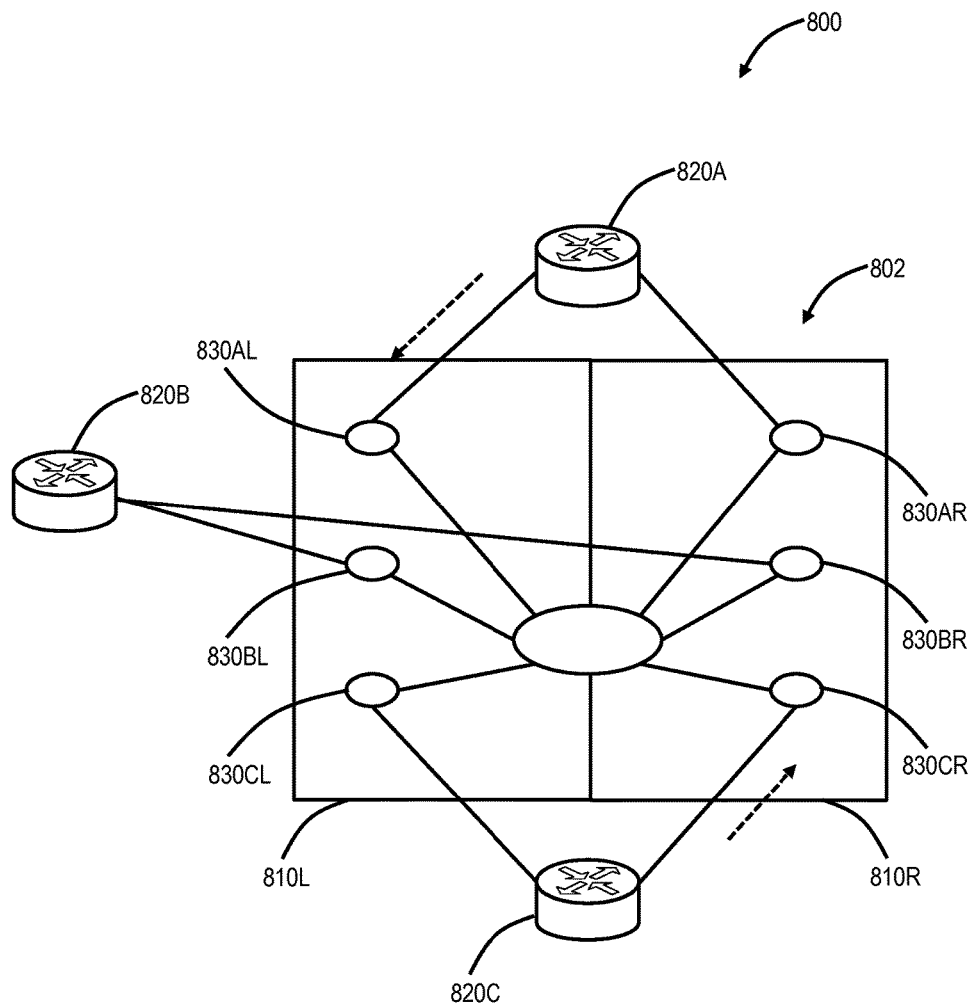
FIG. 11 is a block diagram of a network with a DLAG configuration.

Referring to FIG. 11, in an exemplary embodiment, a block diagram illustrates a network 800 with a DLAG configuration. A switch 802 is logically partitioned into two virtual switches 810L, 810R. A virtual switch is a logical partition on a physical switch that acts independently from other virtual switches on the same physical switch. The DLAG can be based on virtual switches. The network 800 includes routers 820A, 820B, 820C that are each connected to the virtual switches 810L, 810R via ports 830AL, 830AR, 830BL, 830BR, 830CL, 830CR. Here, the virtual switches 810L, 810R are in a DLAG.

Again, the systems and methods include enhanced MAC address Synchronization logic that is based on updated HIT logic (NATIVE_SA_HIT). This has significant advantages including 1) in current solutions with distributed LAG configuration, native-ness decision is not stable and can be updated wrongly during the MAC addresses lifetime (i.e., switch-ID based logic is not able to give correct predictable native-ness property), whereas HIT logic is based on aging cycle that gets re-calculated correctly at every aging cycle expiry; 2) a simpler and dynamic solution in comparison to existing static solutions that use a static value for determining synchronization; and 3) not only taking care of logical distributed LAG ports, but the systems and methods also work for normal logical LAG port (with ports on same switch) and faceplate ports as well. Specifically, the systems and methods utilize the updated HIT logic (NATIVE_SA_HIT), to determine whether or not a switch refreshes a learned MAC address.

This approach is described with respect to two different scenarios. In a first scenario, a same MAC address from two DLAG ports (e.g., ports 830AL, 830AR) are ingressing on different switches 810L, 810R that are interconnected layer-2 switches. For example, if the router 820A sends IP/MPLS traffic with a same MAC Source Address (SA) to the ports 830AL, 830AR, then LAG hashing can hash 50% traffic to each of the ports 830AL, 830AR of the DLAG configuration on the switches 810L, 810R. On both of the switches 810L, 810R, the MAC address is marked as native based on a switch-ID based approach).

Conventionally, the effect here is that forwarding database synchronization logic thinks both switches 810L, 810R MAC addresses are native and each keeps on syncing. The problem arises when traffic stops ingressing because the forwarding database synchronization logic is based on native/non-native property (and not enhanced HIT logic) of the MAC address that in turn is based on static switch-ID based logic. So this syncing will prevent the MAC address from aging out and results in unexpected forwarding of the traffic to the wrong destination after the traffic stops ingressing.

The systems and methods described herein resolves this problem. Specifically, the enhanced MAC address Synchronization logic makes decisions based on enhanced HIT logic (NATIVE_SA_HIT), so initially, both sides of a mated configuration (e.g., ports 830AL, 830AR) have this HIT property set, but as soon as traffic stops on each, this new HIT logic shall get reset after one aging cycle, and the FDB syncing gets stops as well since the HIT logic is reset. Thus, this avoids the above situation where the MAC address never ages out, and traffic gets forwarded to desired destination.

In a second scenario, a non-native MAC address is never changed to native based on a change in traffic flow due to hashing. For example, assume the router 820A sends a MAC-SA to the port 830AL on the switch 810L and it gets flooded to the right switch 810R, such as due to DA lookup failure. Now, there is a MAC-SA that is native on the left switch 810L and non-native on the right switch 810R. Now, assume on the left switch 810L, due to bi-directional traffic, initial DA-LOOKUP failure-based flooding stops and traffic starts unicasting from the left switch only 810L. Now, due to a hashing change at the far end of the router 820A, traffic starts flowing from the right switch 810R where the MAC-SA is non-native. Conventionally, the native/non-native property in switch-ID based logic is not predictable in this distributed LAG configuration, and with this approach the MAC address can remain as non-native at switch 810R, even though traffic is ingressing at a native port now.

Conventionally, the effect is the FDB synchronization will think that at right switch 810R MAC-SA is a non-native MAC address and will never sync it, as the switch-ID based native/non-native property is assume MAC to be non-native, and it cannot get corrected until the MAC address is removed altogether and relearned. Due to lack of syncing here, the MAC address will never get synced and can result in unwanted flooding.

With the systems and methods, the enhanced MAC address Synchronization logic making decisions for synchronization based on the enhanced HIT logic (NATIVE_SA_HIT), a shifting of traffic pattern from the left to right switches 810L, 810R also updates the native/non-native property of the MAC address after expiry of an aging cycle, based on the HIT logic. So native-ness is correctly calculated, and FDB Syncing shall work correctly.

Figure 12:
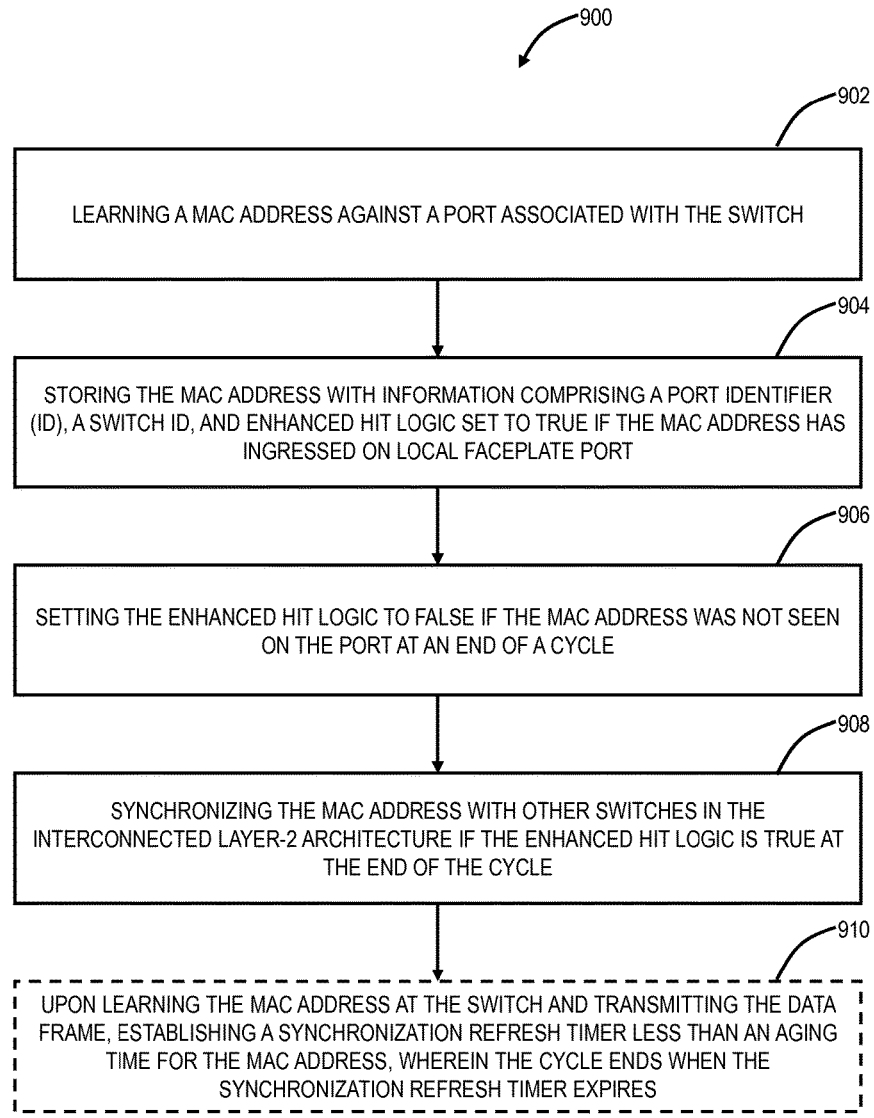
FIG. 12 is a flowchart of a process, in a switch in an interconnected layer-2 architecture, for enhanced forwarding database synchronization of Media Access Control (MAC) addresses based on HIT logic.

Referring to FIG. 12, in an exemplary embodiment, a flowchart illustrates a process 900, in a switch in an interconnected layer-2 architecture, for enhanced forwarding database synchronization of Media Access Control (MAC) addresses based on HIT logic. The process 900 includes learning a MAC address against a port associated with the switch (step 902); storing the MAC address with information including a port Identifier (ID), a switch ID, and enhanced HIT logic set to true if the MAC address has ingressed on a local faceplate port (step 904); setting the enhanced HIT logic to false if the MAC address was not seen on the port at an end of a cycle (step 906); and synchronizing the MAC address with other switches in the interconnected layer-2 architecture if the enhanced HIT logic is true at the end of the cycle (step 908). Optionally, the process 900 can include, upon learning the MAC address at the switch and transmitting the data frame, establishing a synchronization refresh timer less than an aging time for the MAC address, wherein the cycle ends when the synchronization refresh timer expires (step 910).

The switch and the other switches can be configured in a Link Aggregation Group (LAG), which can also be a distributed LAG (DLAG). The synchronizing can include transmitting a data frame to the other switches via inter-switch connectivity, wherein the data frame is created to enable the other switches to learn the MAC address therefrom. The data frame can have a source address including the MAC address, and a switch destination set such that the other switches receive the data frame. The data frame can include a sync unicast packet including an inter-switch header and a Layer-2 header. The inter-switch header can include a source switch indicator identifying the switch, a source port identifier identifying the port on the switch which learned the MAC address, a destination switch including a last switch of the other switches, and a destination port set to an invalid port on the last switch; and the Layer-2 header can include any value for a destination address, a source address set to the MAC address, and empty data. The switch and the other switches can be managed as a single switch from a network element perspective and a network management perspective.

In another exemplary embodiment, a switch includes one or more ports; switching circuitry communicatively coupled to the one or more ports; a forwarding database communicatively coupled to the switching circuitry; and inter-switch connectivity connecting the switch to one or more switches collectively forming a multi-switch architecture; wherein the switch is configured to: learn a MAC address against a port of the one or more ports; store, in the forwarding database, the MAC address with information including a port Identifier (ID), a switch ID, and enhanced HIT logic set to true if the MAC address has ingressed on a local faceplate port; set the enhanced HIT logic to false if the MAC address was not seen on the port at an end of a cycle; and synchronize the MAC address with the one or more switches if the enhanced HIT logic is true at the end of the cycle.

In a further exemplary embodiment, a multi-switch architecture includes a plurality of interconnected switches each including one or more ports and a forwarding database; inter-switch connectivity configured to connect the plurality of interconnected switches; data path queues associated with the inter-switch connectivity; and a dedicated queue associated with the inter-switch connectivity and separate from the data path queues, wherein the dedicated queue is configured for the exchange of data frames between the plurality of interconnected switches for synchronization of the forwarding database of each of the plurality of interconnect switches; wherein, upon learning a new Media Access Control (MAC) address on a port of the one or more ports of a switch of the plurality of interconnected switches, the switch transmits a data frame on through the dedicated queue for the remaining interconnected switches to learn the new MAC address, and wherein each of the plurality of interconnected switches maintains HIT logic for each learned MAC address with the HIT logic set to false if the learned MAC address is not seen in a cycle, and the HIT logic is used to determine whether to refresh synchronization of the learned MAC address.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the approaches above may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, in a switch in an interconnected Layer-2 or multi-chassis architecture, providing enhanced forwarding database synchronization of Media Access Control (MAC) addresses, the method comprising:
    learning a MAC address against a local faceplate port associated with the switch;
    storing the MAC address with information comprising a port Identifier (ID), a switch ID, and the native setting set to true;
    setting a native setting to false if the MAC address was not seen on the local faceplate port in a cycle at an end of the cycle, wherein the native setting represents whether the MAC addresses was hit on the local faceplate port and not on backplane connected ports and is set only based on whether the MAC address was seen on the local faceplate port in the cycle; and
    synchronizing the MAC address with other switches in the interconnected Layer-2 or multi-chassis architecture if the native setting is true at the end of the cycle and not synchronizing the MAC address if it was remotely learned which is indicated by the native setting based on the native setting being false.

2. The method of claim 1, wherein the switch and the other switches are configured in a Link Aggregation Group (LAG) and wherein the LAG is a Distributed LAG (DLAG) or Multi-Chassis LAG (MC-LAG).

3. The method of claim 1, wherein the synchronizing comprises:
    transmitting a data frame to the other switches via inter-switch connectivity, wherein the data frame is created to enable the other switches to learn the MAC address therefrom.

4. The method of claim 3, further comprising:
    upon learning the MAC address at the switch and transmitting the data frame, establishing a synchronization refresh timer less than an aging time for the MAC address, wherein the cycle ends when the synchronization refresh timer expires.

5. The method of claim 3, wherein the data frame has a source address comprising the MAC address and a switch destination set such that the other switches receive the data frame.

6. The method of claim 3, wherein the data frame comprises a sync unicast packet comprising an inter-switch header and a Layer-2 header.

7. The method of claim 6, wherein the inter-switch header comprises a source switch indicator identifying the switch, a source port identifier identifying the port on the switch which learned the MAC address, a destination switch comprising a last switch of the other switches, and a destination port set to an invalid port on the last switch; and
    wherein the Layer-2 header comprises any value for a destination address, a source address set to the MAC address, and empty data.

8. The method of claim 1, wherein the switch and the other switches are one of
    i) managed as a single switch from a network element perspective and a network management perspective; and
    ii) managed as part of more than one network element from a network management perspective.

9. A switch, comprising:
    one or more ports;
    switching circuitry communicatively coupled to the one or more ports;
    a forwarding database communicatively coupled to the switching circuitry; and
    inter-switch connectivity connecting the switch to one or more switches collectively forming a multi-switch architecture,
    wherein the switch is configured to
        learn a Media Access Control (MAC) address against a local faceplate port of the one or more ports,
        store, in the forwarding database, the MAC address with information comprising a port Identifier (ID), a switch ID, and a native setting set to true, wherein the native setting represents whether the MAC address was hit on a local faceplate port and not on backplane connected ports,
        set the native setting to false if the MAC address was not seen on the local faceplate port in a cycle at an end of the cycle, wherein the native setting is set only based on whether the MAC address was seen on the local faceplate port in the cycle, and
        synchronize the MAC address with the one or more switches if the native setting is true at the end of the cycle and not synchronize the MAC address if it was remotely learned which is indicated by the native setting based on the native setting being false.

10. The switch of claim 9, wherein the switch and the one or more switches are configured in a Link Aggregation Group (LAG) and wherein the LAG is a Distributed LAG (DLAG) or Multi-Chassis LAG (MC-LAG).

11. The switch of claim 9, wherein the MAC address is synchronized by transmitting a data frame to the one or more switches via the inter-switch connectivity, wherein the data frame is created to enable the one or more switches to learn the MAC address therefrom.

12. The switch of claim 11, wherein the switch is further configured to:

upon learning the MAC address at the switch and transmitting the data frame, establish a synchronization refresh timer less than an aging time for the MAC address, wherein the cycle ends when the synchronization refresh timer expires.

13. The switch of claim 11, wherein the data frame has a source address comprising the MAC address and a switch destination set such that the one or more switches receive the data frame.

14. The switch of claim 11, wherein the data frame comprises a sync unicast packet comprising an inter-switch header and a Layer-2 header.

15. The switch of claim 14, wherein the inter-switch header comprises a source switch indicator identifying the switch, a source port identifier identifying the port on the switch which learned the MAC address, a destination switch comprising a last switch of one or more switches, and a destination port set to an invalid port on the last switch; and
wherein the Layer-2 header comprises any value for a destination address, a source address set to the MAC address, and empty data.

16. The switch of claim 9, wherein the switch and the other switches are managed as a single switch from a network element perspective and a network management perspective.

17. A multi-switch architecture, comprising:
a plurality of interconnected switches each comprising one or more ports and a forwarding database;
inter-switch connectivity configured to connect the plurality of interconnected switches;
data path queues associated with the inter-switch connectivity; and
a dedicated queue associated with the inter-switch connectivity and separate from the data path queues, wherein the dedicated queue is configured for the exchange of data frames between the plurality of interconnected switches for synchronization of the forwarding database of each of the plurality of interconnect switches,
wherein, upon learning a new Media Access Control (MAC) address on a port of the one or more ports of a switch of the plurality of interconnected switches, the switch transmits a data frame on through the dedicated queue for the remaining interconnected switches to learn the new MAC address, and
wherein each of the plurality of interconnected switches maintains a native setting for each learned MAC address which represents whether the learned MAC address was hit on a local faceplate port and not on backplane connected ports and with the native setting set to false if the learned MAC address is not seen in a cycle, wherein the native setting is set only based on whether the MAC address was seen on the local faceplate port in the cycle, and the native setting is used to determine whether to refresh synchronization of the learned MAC address such that the MAC address is synchronized with the plurality of interconnected switches if the native setting is true at the end of the cycle and the MAC address is not synchronized if it was remotely learned which is indicated by the native setting based on the native setting being false.

18. The multi-switch architecture of claim 17, wherein at least two of the plurality of interconnected switches are configured in a Distributed Link Aggregation Group (DLAG) or a Multi-Chassis Link Aggregation Group (MC-LAG).

* * * * *